Feb. 13, 1951 E. COLE 2,541,039
AMPLITUDE CHANNELIZER
Filed March 6, 1948
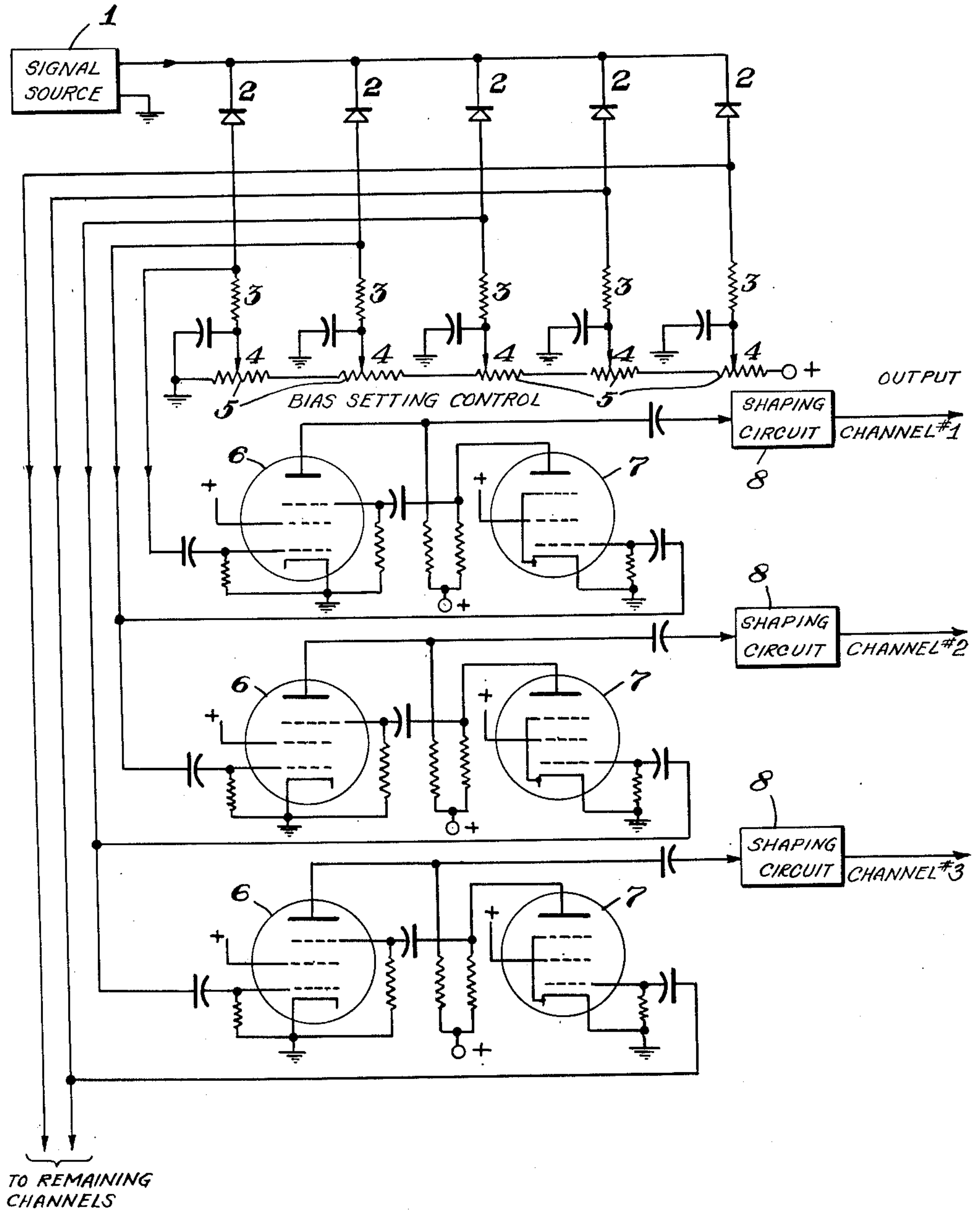
INVENTOR.
EUGENE COLE, DECEASED,
BY ZELDA COLE, Adm.
BY
R. P. Morris
ATTORNEY Patented Feb. 13, 1951

2,541,039

UNITED STATES PATENT OFFICE 2,541,039

AMPLITUDE CHANNELIZER

Eugene Cole, deceased, late of Kew Gardens, N. Y., by Zelda Cole, administratrix, Forest Hills, N. Y., assignor to Federal Telecommunication Laboratories, Incorporated, New York, N. Y., a corporation of Delaware Application March 6, 1948, Serial No. 13,437

4 Claims. (Cl. 250—27)

This invention relates to electrical translation systems, and more particularly to electrical translation systems of the class which may be termed amplitude channelizers. An amplitude channelizer as here used refers to an apparatus which has for its function the classification of signals in accordance with the amplitude ranges within which said signals lie; and more specifically the production of output indication on a channel specially reserved for signals having an amplitude lying within a given range.

In United States Patent No. 2,272,070, issued to A. H. Reeves, there is disclosed and claimed a system of communication in which, instead of transmitting a continuously varying signal, there is transmitted instead a quantized signal; that is to say, the signal to be transmitted is scanned in amplitude at periodic intervals, and the values of amplitude obtained by the scanning operation are then transmitted in quantized form. In such systems, speaking generally, whenever a given pulse has an amplitude lying within a specified range, another pulse having a fixed amplitude representing all amplitudes within said range is transmitted instead of the original. By this process a continuously varying function is replaced by a function which takes on discrete values only. It is to be noted that the process of channelizing a signal in accordance with amplitude, inherently includes the process of quantizing.

An object of the present invention is to provide an improved amplitude channelizer which relies for its operation upon the action of a plurality of rectifiers biassed at voltages corresponding to the amplitude levels at which it is required to separate channels.

Another object of the invention is to provide an improved amplitude channelizer which is equally suitable for the channelizing of pulses and for the channelizing of continuously varying functions.

In accordance with a feature of the invention, a signal characterized by its amplitude is applied to a plurality of rectifiers biassed across load resistors to individually adjusted potentials, and the output taken from said load resistors are applied to individual gating circuits, which in turn are controlled by others of said outputs.

In accordance with another feature of the invention, the output of the gating circuit associated with each biased rectifier is controlled in turn by the output of the rectifier biassed at the next lower potential, so that only one gating circuit at a time is open.

In accordance with a further feature of the invention, phase inverting means for providing the proper polarity to close each of said gating circuits are provided for the output of each of said rectifiers.

The invention is described in connection with a plurality of channels, each corresponding to a separate amplitude range and has particular application to the channelizing of pulses in accordance with their amplitude. The invention may also be readily applied to the separation of a continuously varying function into a number of channels, as the function changes from one amplitude range to another.

The above-mentioned and other features and objects of the invention and the manner of attaining them will become more apparent and the invention itself will be best understood by reference to the following description of an embodiment of the invention taken in conjunction with the accompanying drawing which shows a schematic diagram of an amplitude channelizer constructed in accordance with the principles of this invention.

Referring now to the drawing, I show a signal source 1, which produces a signal such as a train of modulated pulses. The output of signal source 1 is applied to a plurality of biassed rectifiers 2, which may be for example simple crystal rectifiers. The rectifiers 2 are each biassed across corresponding load resistors 3 to potentials determined by the setting of the potentiometers 4 which comprises the bias setting control resistor 5. If a signal having an amplitude lying between the voltage setting of two of the potentiometers 4 is applied to the series of biassed rectifiers 2, all the rectifiers biassed to a lower value than the input signal conduct while all the rectifiers biassed to a higher value than the input signal do not conduct. Output indications are accordingly developed only across those resistors 3 whose corresponding rectifiers 2 conduct. The output of each of the biassed rectifiers 2 is led to a corresponding one of a plurality of gating tubes 6. These gating tubes may of course be replaced by any other convenient electrical gates, but they are shown here for convenience as pentodes. At the same time, the output of each of the biassed rectifiers is applied to a corresponding one of a plurality of phase inverting amplifiers 7. As can be seen from the diagram each of the phase inverter tubes 7 is associated with one of the gating tubes 6 and the output of each biassed rectifier which is applied to one of the gating tubes 6 is applied to the phase inverting tube 7 which is associated with the gating tube 6 of the next lower biassed rectifier.

The operation of the circuit will then be as follows: When a signal having a voltage amplitude lying within the range of bias settings of the bias setting control 5 is applied to the input of the biassed rectifiers 2, output voltages will be produced across all the load resistors 3 whose corresponding rectifiers are biassed at lower potentials than the amplitude of the applied signal, and no output voltages will be produced across load resistors 3 whose corresponding rectifiers are biassed at potentials greater than the applied signal. The signals produced across load resistors 3 are applied to the inputs of gating amplifiers 6. Only the amplifier 6 associated with the conducting rectifier which is biassed to the highest potential will conduct however, because all the gating tubes which derive their input signals from rectifiers biassed to lower potentials will be cut off by large negative voltages obtained from the phase inverting amplifiers 7 and applied to their suppressor grids. Accordingly, only one output channel will be energized at a time. The variations in amplitude of the input signal are translated into discreet channels, and are then applied to shaping circuit 8. Each of the shaping circuits 8 may produce signals representative of a given range of amplitudes. Such a signal may be a single pulse having a predetermined number of quanta, or a complex signal such as a group of pulses having predetermined characteristics.

While I have described above the principles of my invention in connection with specific apparatus, it is to be clearly understood that this description is made only by way of example, and not as a limitation to the scope of my invention.

What is claimed is:

1. An electrical translator for channelizing a signal in accordance with its amplitude, comprising means for applying said signal to a plurality of rectifiers each biassed by a voltage applied across a corresponding load resistor to one of a different plurality of different voltages, a plurality of normally conducting gating tubes each having a cut off grid and each being coupled to a corresponding one of said rectifiers, a plurality of phase inverting amplifiers, means for applying the voltages developed across each of said load resistors in response to said signal to the input of the gating tube associated with said load resistor, and to the input of a corresponding one of said amplifiers, means for applying the output of said phase inverting amplifiers to the cut off grid of the gating amplifier coupled to the rectifier biassed at the next lower potential, and an output circuit for each of said gating tubes.

2. An electrical translator for channelizing a signal in accordance with its amplitude, comprising a plurality of rectifiers each biassed by a voltage applied across a corresponding load resistor to a different voltage level, a normally conductive separate gating tube arranged to receive the output energy taken from each of said load resistors, a phase inverting amplifier arranged to receive the output energy of the load resistor associated with the rectifier biassed at the next higher level, means to utilize the output energy of said phase inverting amplifier to cut off said gating tube, and an output circuit for each of said gating tubes.

3. An electrical translator according to claim 2, wherein said output circuit for each of said gating tubes comprises means for producing a signal representative of a given range of input voltages.

4. An electrical translator for channelizing a signal in accordance with its amplitude, comprising a plurality of rectifiers each biassed by a voltage applied across a corresponding load resistor to a corresponding predetermined level, means for applying the output energy taken from each of said load resistors to a corresponding normally conductive gating circuit associated with each of said levels and to a corresponding phase inverting amplifier, with its output so connected as to cut off a gating circuit associated with the next lower level, and an output circuit for each of said gating circuits.

ZELDA COLE,
*Administratrix of the Estate of Eugene Cole, Deceased.*

REFERENCES CITED

The following references are of record in the file of this patent:

UNITED STATES PATENTS

| Number | Name | Date |
|---|---|---|
| 2,282,046 | Goldsmith | May 5, 1942 |
| 2,312,357 | Odquist et al. | Mar. 2, 1943 |
| 2,404,250 | Rajchman | July 16, 1946 |
| 2,413,440 | Farrington | Dec. 31, 1946 |
| 2,419,548 | Grieg | Apr. 29, 1947 |
| 2,420,374 | May | May 13, 1947 |